Jan. 15, 1929.
W. N. HENDERSON
1,698,722
PROCESS OF EXPLOITING GASES CONTAINING NITROGEN, HYDROGEN, AND CARBON DIOXIDE
Filed March 21, 1925
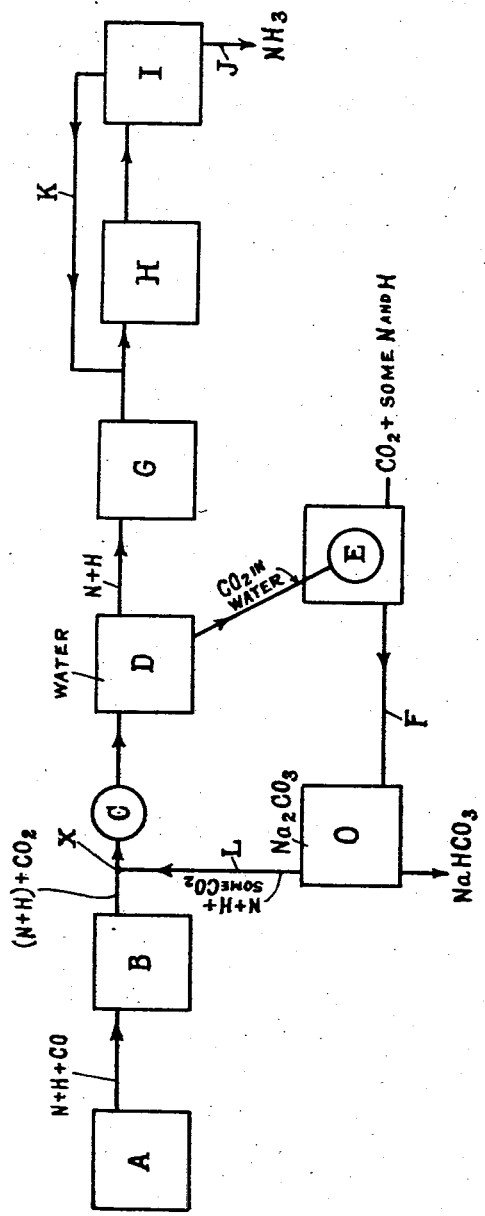
WITNESS
INVENTOR
WILLIAM N. HENDERSON
BY
ATTORNEYS Patented Jan. 15, 1929.

1,698,722

UNITED STATES PATENT OFFICE.

WILLIAM N. HENDERSON, OF SYRACUSE, NEW YORK, ASSIGNOR TO SOLVAY PROCESS COMPANY, OF SOLVAY, NEW YORK, A CORPORATION OF NEW YORK.

PROCESS OF EXPLOITING GASES CONTAINING NITROGEN, HYDROGEN, AND CARBON DIOXIDE.

Application filed March 21, 1925. Serial No. 17,452.

My invention relates to a process wherein, after producing gas which contains nitrogen and hydrogen, preferably in the general ratio of 1 to 3, and $CO_2$, the gas mixture is exploited to best advantage and preferably in such a way that each of its ingredients ultimately participates in the constitution of a marketable end product. More particularly the end products in question are refined sodium bicarbonate and ammonia. The process in its complete development is a cyclic process with respect to that phase of the invention in which the sodium bicarbonate end product is obtained, where the residual gases from the sodium bicarbonate tower re-enter the stream of gases from which the $CO_2$, required for the manufacture of the bicarbonate, is extracted, said residual gases having been, as the result of diminution of $CO_2$ retained in the bicarbonate tower, concentrated, relatively, with respect to nitrogen and hydrogen in the 1 to 3 relation desired for the production of the ammonia end product. The process may therefore be regarded from a number of different aspects according to the emphasis which is placed upon the process as a process for producing ammonia or as a process for producing bicarbonate or as a cyclic process, the advantages of which are reflected in the production of both end products.

In the accompanying drawing there is illustrated diagrammatically an arrangement or illustrative flow sheet indicative of the method of carrying out the invention in its preferred embodiment.

In this drawing A indicates a producer of gas whose dominating content is hydrogen and carbon monoxide. A gas of this character may be produced by passing steam through an incandescent fuel. By also passing air through such fuel or admitting air to the gas at a subsequent point, nitrogen is caused to enter the gas composition. The gas is then preferably subjected to catalysis with steam in the presence of an iron catalyst as indicated at B, whereby, in accordance with the equation usually written $CO + H_2O = CO_2 + H_2$ each volume of CO is replaced by a corresponding volume of hydrogen. At this point the procedure is preferably such as to control and regulate the amount of nitrogen in the gas, so that the gas stream as it leaves the converter B has a content of nitrogen and hydrogen in the approximate relation of 1 to 3. The gas here contains considerable volumes of $CO_2$. The gases from the converter B are compressed at C, preferably to approximately 100 atmospheres and this pressure is maintained throughout the system shown in the drawing as D, G, H, I, and K. The gas stream under the stated pressure passes from the compressor C to a water scrubber D. The function of this treatment is to separate practically all of the $CO_2$ from the nitrogen and hydrogen gas by absorption of the former in water. The water from the water scrubber passes preferably to an orifice which is directed against some mechanical motor such as a Pelton wheel indicated at E, said device E serving to actuate an electric or other power producer whose power product can be conveniently applied in the system A to J or otherwise. As the water from D leaves its exit orifice, the resultant diminution of pressure causes evolution of absorbed $CO_2$.

A certain quantity of nitrogen and hydrogen is also absorbed by the water in D and passes from the water scrubber D into the gaseous atmosphere at E, so that at this point there is a gas mixture which contains say approximately 80% to 85% $CO_2$ together with some nitrogen and hydrogen.

The degree of the release of pressure at E can be controlled by any suitable means, the gas stream at E must, however, be confined as indicated by the square surrounding E in the drawing. The E-gas, having the constitution described, is led through F preferably under its residual retained pressure, into and through a tower O which is fed with a strong aqueous solution of soda ash ($Na_2CO_3$) for example, such as is obtained from the ammonia soda process. The soda ash solution, as it comes into contact with the E-gas, reacts with the carbon dioxide yielding sodium bicarbonate as a precipitate according to the equation generally stated as follows: $Na_2CO_3 + CO_2 + H_2O = 2NaHCO_3$. The precipitate which constitutes one of the end products of this process is removed by filtration, and the filtrate is generally returned to the process according to details of practice which it is not deemed necessary to set forth herein. The gas from E, after passing through the tower O, now obviously contains less $CO_2$ and is to that extent correspondingly concentrated with respect to its content of nitrogen and hydrogen. The gases leaving the tower O, therefore, are consequently of the very type which it is the object of the system A, B to produce. Accordingly the residual gases from the tower O are led through L, preferably under the propulsion of the pressure retained at E back into the system A, B, C at X. Such $CO_2$ as these gases may still contain again passes through the water scrubber D and consequently through the tower O and thus becomes available for use in the tower O.

In the meantime the gas which has been stripped of its $CO_2$ content at D and which contains nitrogen and hydrogen in the 1 to 3 relation, passes through purification at G and finally into a converter H, wherein an ammonia catalyst permits the combination of $NH_3$ to be formed between parts of the gas passing the catalyst. The ammonia thus produced is liquefied by refrigeration at I and unconverted gases are resubjected to the catalyst in H by being led through the conduit K. At J is indicated the outlet for the liquid anhydrous ammonia which is one of the end products of this process.

The constitution of the gas admitted to the carbonating tower O is, for example, about 85% $CO_2$ and 15% hydrogen plus nitrogen while exit gas from said tower passing through L is composed of about 15% of $CO_2$ and of about 83% of hydrogen plus nitrogen. The crude gas entering the water scrubber D from the oxidation system B contains, for example, about 25% to 30% of $CO_2$ and from 67% to 72% of nitrogen plus hydrogen. The return of the gas through L therefore enriches the product of the oxidation system B with respect to its content of hydrogen and nitrogen.

The treatment of an aqueous solution of soda ash with a gas containing carbon dioxide in a tower at a properly regulated temperature is in itself a well-known process for which no claim is made herein. According to the standard process the source of the carbon dioxide is lime kiln gas which contains about 40% of $CO_2$, the remainder being chiefly nitrogen. The production of lime kiln gas is obviously an expense which is entirely obviated by the procedure of this invention and from the standpoint of the ammonia end product of the new process, the $CO_2$ gas at E is a waste by-product which from the bicarbonate aspect may therefore be regarded as a gas which is produced without cost, at least without extra cost than would be required for the synthetic ammonia process as such. On the other hand, the E-gas of this specification contains approximately twice the percentage of carbon dioxide that was present in lime kiln gas. This increased concentration in the reacting gas renders the E-gas more efficient for the treatment of the soda ash solution, the rate of reaction being increased, with resultant increase in the production capacity of the carbonating tower and in the percentage of conversion of the soda ash (sodium carbonate) in the liquor. Then again there is a material economy of power in that lime kiln gas requires pumps to force it into the bottom of the carbonating tower, whereas, according to the present invention no pumps or the like are required, but the E-gas can be expanded from the water scrubber liquor in D at a pressure sufficient to force it into the carbonating tower, whereby the use of gas pumps would be entirely obviated. Then again the exit gas from the carbonating tower O, when lime kiln gas is used, is practically useless for any purpose, whereas the exit gases from O, according to the present invention, are not only available for re-introduction into the system A, B, C, but are concentrated by reason of having passed through the tower O, with respect to the very gases which it is the object of the system A, B to produce, while such $CO_2$ as may still be retained in the gases is not lost, but becomes again available, after subsequently passing through E, for re-active effect on the soda ash liquor in O. In other words, there is no loss of $CO_2$ in the bicarbonate process such as is generally encountered where lime kiln gas is used. In the bicarbonate process, as usually operated, the exit gas from the carbonating tower still contains about 15% $CO_2$. Where the E-gas is used this means bringing its original 85% content of $CO_2$ down to 15%, indicating a utilization of 70/85 or about 82% of the carbon dioxide originally present in such gas. In the case of lime kiln gas on the other hand, bringing its original 40% of $CO_2$ down to 15% indicates the utilization of only 25/40 or 62.5% of the carbon dioxide originally present in said gas. 37½% of the carbon dioxide in the lime kiln gas is thus a definite loss, whereas in the case of E-gas of this application there need be no loss at all because the unused 18% of the $CO_2$ content originally present in the E-gas is passed back into a future supply of E-gas for resubmission to the soda liquor.

Of course, the process of this application can be regulated in numerous respects to secure the best advantages. Thus, for example, if a $CO_2$ gas containing less than 80% to 85% $CO_2$ should be found desirable for conducting the carbonating reaction, all that would be needed is to dilute the E-gas with some of the gas flowing through the conduit leading from B through C to D. It will be observed that while the new process begins with the production of a single stream of gas containing nitrogen, hydrogen and $CO_2$, it ends with two definite marketable products, ammonia and sodium bicarbonate, and that by the production of each of said two end products in the manner described, the process required for the production of the other end product may be correspondingly improved. At the same time it is possible by omitting one or the other of the steps recited for carrying out the complete process to derive at least partially the advantages of the invention and it is the function of the appended claims to cover said invention where the whole or only the salient features of the invention be attempted to be practiced by those not authorized to do so under this patent.

I claim:

1. The process which consists in producing a gaseous mixture containing hydrogen, nitrogen, and carbon dioxide, subjecting the mixture to substantial pressure and under such pressure effecting a separation between the major part of the nitrogen plus hydrogen component and the $CO_2$ component by scrubbing the gas with water to absorb carbon dioxide, then causing separation of absorbed $CO_2$, leading the thus liberated gas into reactive relation with sodium carbonate to produce sodium bicarbonate as one end product of the process, returning the gas remaining after such reaction to the gas mixture on its way to the water scrubber so that the same shall be again subjected to the action of the water in said scrubber, while continuously leading the unabsorbed hydrogen-nitrogen gas mixture from the water scrubber through purification and thence through an ammonia converter and removing the ammonia formed as another end product of the process.

2. The process which consists in producing a gaseous mixture containing hydrogen, nitrogen, and carbon dioxide, subjecting the mixture to substantial pressure and under such pressure effecting a separation between the major part of the nitrogen plus hydrogen component and the $CO_2$ component by scrubbing the gas with water to absorb carbon dioxide, then causing separation of absorbed $CO_2$, simultaneously causing the charged water to act as a motive agent while reducing pressure so as to liberate the absorbed gas, leading the thus liberated gas into reactive relation with sodium carbonate to produce sodium bicarbonate as one end product of the process, returning the gas remaining after such reaction to the gas mixture on its way to the water scrubber so that the same shall be again subjected to the action of the water in said scrubber, while continuously leading the unabsorbed hydrogen-nitrogen gas mixture from the water scrubber through purification and thence through an ammonia converter and removing the ammonia formed as another end product of the process.

3. The process which consists in producing a gaseous mixture containing hydrogen, nitrogen, and carbon dioxide, subjecting the mixture to substantial pressure and under such pressure effecting a separation between the major part of the nitrogen plus hydrogen component and the $CO_2$ component by scrubbing the gas with water to absorb carbon dioxide, then causing separation of the absorbed $CO_2$ by partially, but not wholly relieving the pressure, thereby retaining a substantial amount of pressure in the $CO_2$ gas stream, leading the thus liberated gas by means of its retained pressure into reactive relation with sodium carbonate to produce sodium bicarbonate as one end product of the process, returning the gas remaining after such reaction to the gas mixture on its way to the water scrubber, so that the same shall be again subjected to the action of the water in said scrubber, while continuously leading the unabsorbed hydrogen-nitrogen gas mixture from the water scrubber through purification and thence through an ammonia converter, and removing the ammonia formed as another end product of the process.

4. The process which consists in producing a gaseous mixture containing hydrogen, nitrogen, and carbon dioxide, separating the major part of the nitrogen plus hydrogen component from the $CO_2$ component by treating the gas mixture with a $CO_2$ absorbent preparatory to using the major part of the hydrogen and nitrogen components in an ammonia synthesizing operation, then causing separation of the absorbed $CO_2$, leading the thus liberated gas into reactive relation with sodium carbonate to produce sodium bicarbonate, and returning the gas remaining after such reaction to the first mentioned gaseous mixture containing hydrogen, nitrogen, and carbon dioxide.

In testimony whereof I have hereunto set my hand.

WILLIAM N. HENDERSON.

CERTIFICATE OF CORRECTION.

Patent No. 1,698,722.  Granted January 15, 1929, to

WILLIAM N. HENDERSON.

It is hereby certified that error appears in the above numbered patent requiring correction as follows: In the drawing, in the notation with reference to the line passing from "D to E" before the word "in" insert "+ some N and H"; and that the said Letters Patent should be read with this correction therein that the same may conform to the record of the case in the Patent Office.

Signed and sealed this 5th day of March, A. D. 1929.

(Seal)

M. J. Moore,
Acting Commissioner of Patents.